US006948812B2

(12) United States Patent
Wichner

(10) Patent No.: US 6,948,812 B2
(45) Date of Patent: Sep. 27, 2005

(54) CAP VISOR EYE SHIELD

(76) Inventor: Sanford M. Wichner, 1010 Barbara La., San Pablo, CA (US) 94806

( * ) Notice: Subject to any disclaimer, the term of this patent is extended or adjusted under 35 U.S.C. 154(b) by 0 days.

(21) Appl. No.: 10/776,725

(22) Filed: Feb. 11, 2004

(65) Prior Publication Data

US 2005/0174532 A1 Aug. 11, 2005

(51) Int. Cl.[7] .................... G02C 3/00
(52) U.S. Cl. .................... 351/155; 2/10
(58) Field of Search .................... 351/155, 158, 351/51; 2/451, 453, 10

(56) References Cited

U.S. PATENT DOCUMENTS

| | | | |
|---|---|---|---|
| 4,541,125 A | 9/1985 | Phillips | |
| 5,056,164 A | 10/1991 | Lisle et al. | |
| 5,129,102 A | 7/1992 | Solo | |
| 5,208,916 A | 5/1993 | Kelman | |
| 5,261,124 A | 11/1993 | Day | |
| 5,422,686 A | 6/1995 | Kelman et al. | |
| 5,615,413 A | 4/1997 | Bower | |
| 5,898,935 A | 5/1999 | Davis | |
| 5,987,640 A | 11/1999 | Ryder | |
| 6,088,837 A | 7/2000 | Baker | |
| 6,481,060 B1 | 11/2002 | Tsai | |
| 6,491,390 B1 | 12/2002 | Provost | |
| 6,595,635 B2 * | 7/2003 | Schubert | 351/155 |

* cited by examiner

*Primary Examiner*—Hung Xuan Dang
(74) *Attorney, Agent, or Firm*—Dale J. Ream

(57) ABSTRACT

An eye shield device for a visor broadly includes an eye shield assembly and an attachment assembly for removably attaching the eye shield assembly to the visor. The attachment assembly includes a pair of opposed support members, an eye shield mount for coupling the eye shield assembly to the attachment assembly for permitting pivotal movement of the eye shield assembly about a first axis, and a generally flexible band coupled with and spanning between the support members defining a visor-receiving slot between the band and the eye shield assembly.

17 Claims, 8 Drawing Sheets

CAP VISOR EYE SHIELD

BACKGROUND OF THE INVENTION

1. Field of the Invention

The present invention relates generally to eyeglasses and more particularly to shaded eyeglasses for reducing the glare of light and that may be removably attached to a variety of sizes of visors. The present invention also relates to a visor attachment that may be moved between a stowed position and a deployed position while attached to the visor.

2. Discussion of the Prior Art

Sunlight is a common source of damage to human eyes, whether from short term direct exposure resulting in immediate burning of the retinas or long term exposure to ultraviolet rays that may lead to earlier and more severe occurrences of cataract, a clouding of the lenses of human eyes. Such problems cause degradation of eyesight and even blindness in humans, affecting one's lifestyle in a negative manner.

As a result, sunglasses have been developed to assist in shading eyes from the harmful effects of sunlight. Special lenses have been developed to filter the most harmful rays of sunlight. Conventional sunglasses incorporate a frame having a pair of lens receiving holes and a pair of hinged temple bars designed to rest on the ears of a user. Such conventional glasses may become uncomfortable to wear for long periods of time as a result of pressure placed on the wearer's head by the temple bars.

In recent years, more people have become aware of other harmful effects of sunlight, such as skin cancer. To reduce the risk of skin cancer, many people wear head gear having a visor, covering and thus protecting the top of one's head from sunlight while the visor shades the face. Sunglasses have been known in the art that clip onto the visor of such a hat to provide shading of light received by the eyes while having the shading benefits associated with visored hats. Such devices reduce discomfort associated with conventional sunglasses while yielding their shading benefits.

Due to the fact that hats and visors attached thereto come in many different shapes and sizes, there is a need to provide an eye protection device that may be removably attached to visors of various sizes. There also exists a need to provide such a device that may be easily moved between a working, deployed position in which an eye shield is positioned in front of a user's eyes, and a non-working, stowed position wherein the shield is generally out of the line of sight of the user.

BRIEF SUMMARY OF THE INVENTION

An eye shield device for a visor broadly comprises an eye shield assembly and an attachment assembly for removably attaching the eye shield assembly to the visor. The eye shield assembly includes a one-piece lens and a flexible shaping bar coupled with an upper edge of the lens. The shaping bar may be used to adjust the curvature of the lens in order to provide a custom fit for visors of varying sizes and curvatures.

The attachment assembly includes a pair of opposed support members, and an eye shield mount for coupling the eye shield assembly to the attachment assembly for permitting pivotal movement of the eye shield assembly about a first axis. The attachment assembly also includes a generally flexible, elastic band coupled with and spanning between the support members. A visor-receiving slot is defined between the band and the eye shield assembly. When the visor is inserted into the visor-receiving slot, the band is stretched to the point of being in tension between the support members for securing the device to the visor. By stretching the band further, the device may be removed from the visor.

The eye shield mount includes a pair of mounting members coupled with opposed sides of the lens. Each mounting member includes a post. The support members each include an adjustment slot defined therein for receiving one of the posts. The eye shield assembly is pivoted on the posts about the first axis for movement between a deployed position in front of a user's eyes and a stowed position generally out of the line of sight of the user.

In an alternative form, the eye shield assembly includes a pair of lenses connected by a centrally disposed bridge. A unitary mount is positioned between and coupled with the support members, and a telescopic arm depends from the mount and is coupled with the eye shield assembly. The arm may be pivoted about a first axis for selective positioning of the eye assembly. The arm provides a means of adjusting the location of the eye shield assembly while in deployed or stowed positions.

The bridge includes a pair of outer bridge panels hingedly coupled with a centrally disposed central bridge panel. Each outer bridge panel is coupled with one of the lenses. As a result, each lens may be pivoted about separate axes for adjusting the curvature of the eye shield assembly.

In another alternative form, the eye shield device includes a bridge having a central portion coupled with the arm, and first and second outer portions. The first and second outer portions are coupled with the central portion for pivotal movement about generally parallel first and second bridge axes. The first and second outer portions each include a hinge permitting pivotal movement of the first and second lenses about third and forth axes. The third and forth axes do not intersect the first and second axes. Therefore, this alternative embodiment permits adjustment of the curvature of the eye shield assembly and permits adjustment of the distance between the lenses for adapting to users having varying eye spacing distances.

BRIEF DESCRIPTION OF THE SEVERAL VIEWS OF THE DRAWINGS

A preferred embodiment of an eye shield device for a visor is described in detail below with reference to the drawing figures, wherein.

DETAILED DESCRIPTION OF THE PREFERRED EMBODIMENT

Figure 1A:
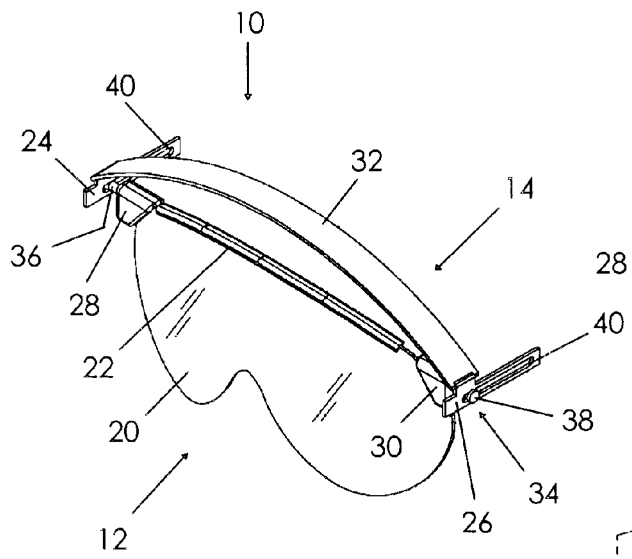
FIG. 1*a* is a perspective view of an eye shield device constructed in accordance with one embodiment of the present invention.

Referring now to the drawings, FIG. 1*a* depicts an eye shield device 10 constructed in accordance with one embodiment of the present invention. The device 10 broadly comprises an eye shield assembly 12 and an attachment assembly 14 for removably attaching the eye shield assembly 12 to the visor 16 of a cap 18.

The eye shield assembly 12 includes a shaded one-piece, non-prescription lens 20 and a flexible shaping bar 22 coupled with an upper edge of the lens 20. The lens 20 is preferably constructed of a synthetic material providing flexibility and adequate transparency for optical purposes. The shaping bar 22 is used to adjust the curvature of the lens 20 in order to provide a custom fit for visors 16 of varying sizes and curvatures. The shaping bar 22 is preferably constructed from a material that may be bent and once bent retain the desired shape. For example, the bar may be constructed from a metallic material.

The attachment assembly 14 includes a pair of opposed support members 24, 26, and pair of mounting members 28, 30 for coupling the eye shield assembly 12 to the attachment assembly 14 and for permitting pivotal movement of the eye shield assembly 12 about a first axis. The first axis is generally parallel with a line tangent to a mid-point of the visor 16. The attachment assembly 14 also includes a generally flexible, elastic band 32 coupled with and spanning between the support members 24, 26. A visor-receiving slot is defined between the band 32 and the eye shield assembly 12.

Figure 1B:
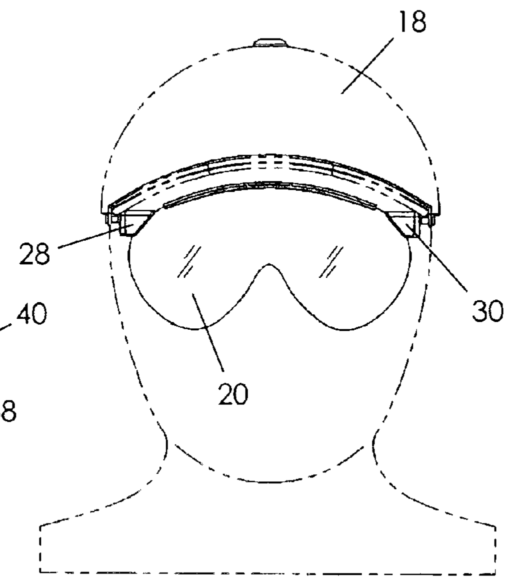
FIG. 1*b* is a front view of the device of FIG. 1*a* with the eye shield in a deployed position.

The mounting members each include a post 34 having a shank 36 and cap 38. An elongated slot 40 is defined in each support member for receiving the posts 34 and permiting rotation of the posts 34 therein for permitting pivotal movement of the lens 20 between a stowed position, shown in FIGS. 1*c* and 1*d*, and a deployed position, shown in FIG. 1*b*. In addition, the elongated slots 40 permit sliding of the posts 40 in order to facilitate adjustment of the position of the first axis, thereby allowing a user to move the lens 20 closer to or farther away from their face. For example, when in the deployed position, it may be desired to move the lens 20 relatively close to one's face, as shown in FIG. 2*a*, in order to more completely shade one's eyes. While in the stowed position, it may be desired to move the lens 20 relatively farther away from one's face to improve the field of vision of the user, as shown in FIG. 2*b*.

Figure 1C:
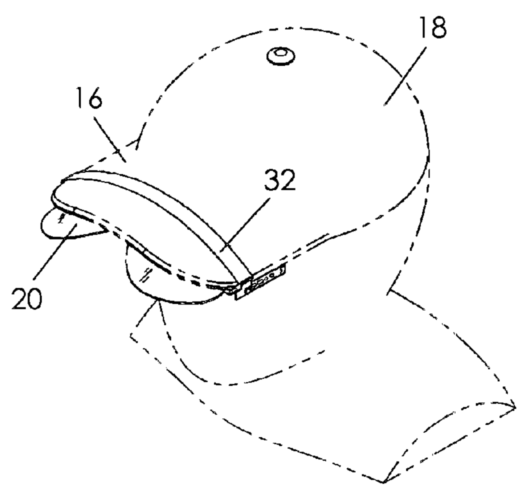
FIG. 1*c* is a perspective view of the device of FIG. 1*b* with the eye shield in a stowed position.
Figure 1D:
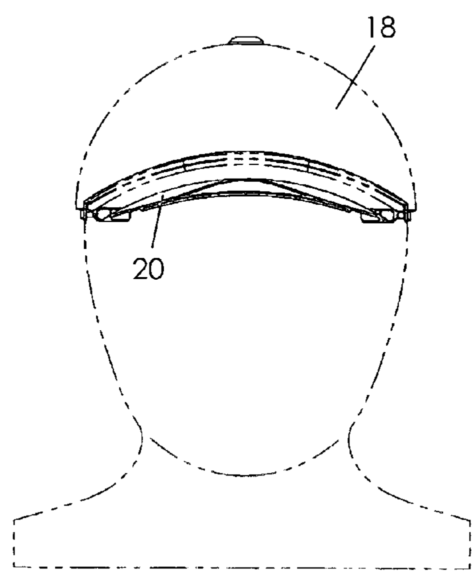
FIG. 1*d* is a front view of the device of FIG. 1*c;*
Figure 2A:
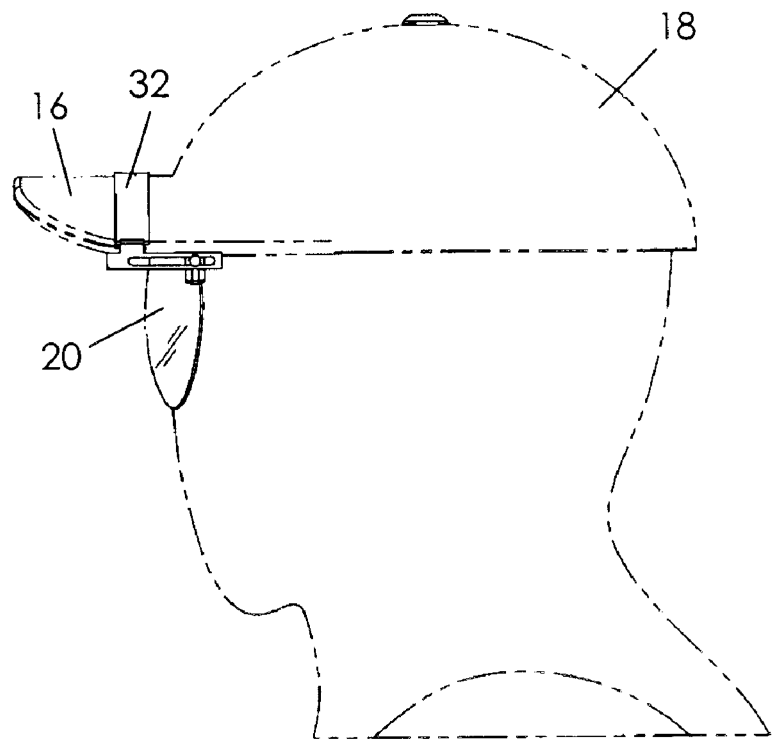
FIG. 2*a* is a side view of the device of FIG. 1*b;*
Figure 2B:
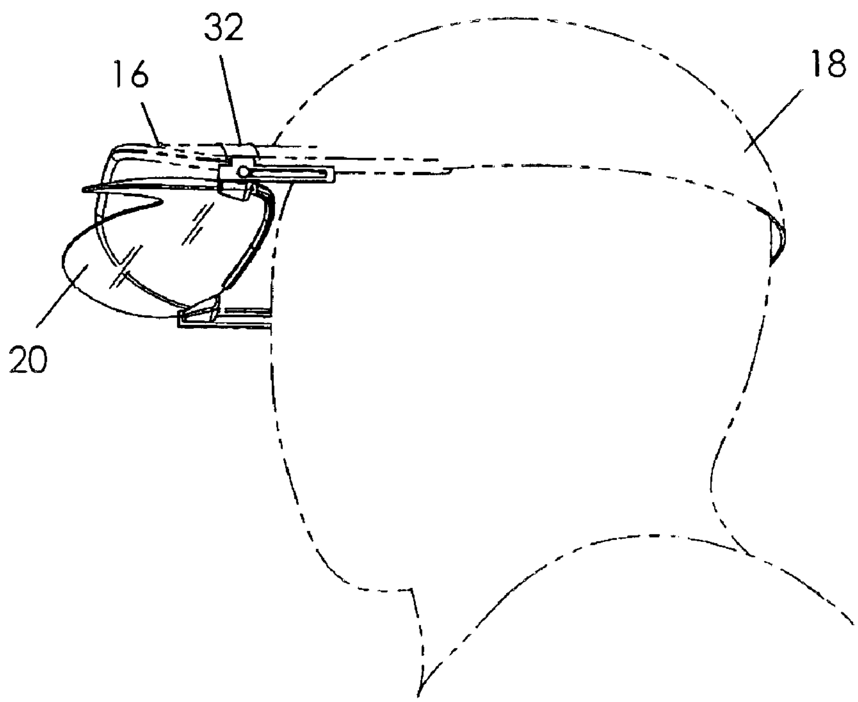
FIG. 2*b* is a perspective view of the device of FIG. 1*c;*

Turning now to FIG. 1*c*, the eye shield device 10 is positioned for use around the visor 16 of a cap 18 so that the eye shield assembly 12 is beneath the visor 16 and the band 32 is stretched over the top of the visor 16. The relative length of the band 32 and elastic qualities thereof act to secure the device 10 to the visor 16 permitting selective positioning of the lens 20 depending upon the existing lighting conditions. If eye shading is not required for an extended period, but the user desires to wear the cap 18, the device 10 is easily removed by stretching the band 32 in order to slip the visor 16 from the visor-receiving slot defined between the band 32 and eye shield assembly 12.

Figure 3A:
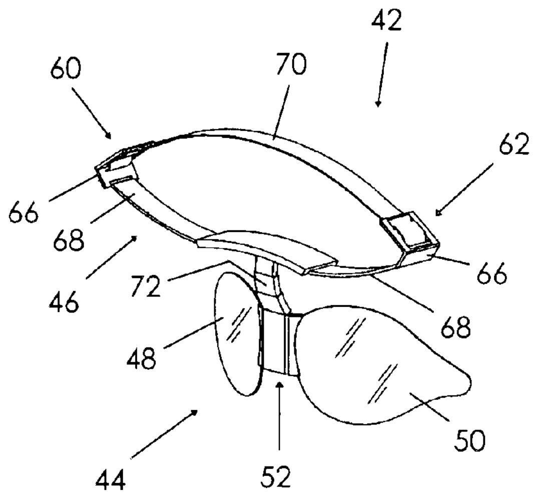
FIG. 3*a* is a perspective view of an eye shield device constructed in accordance with another embodiment of the invention.
Figure 4:
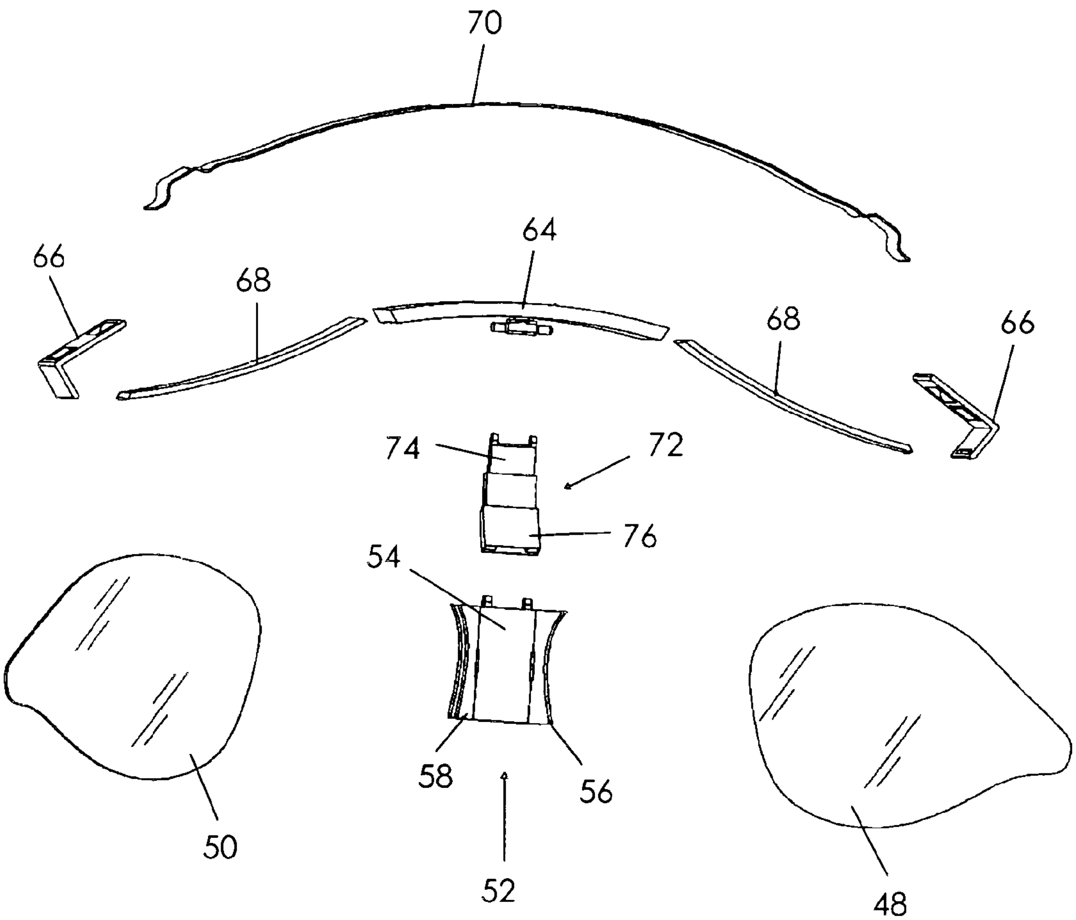
FIG. 4 is an exploded view of the device of FIG. 3*a;*

Another eye shield device 42 is shown in FIG. 3*a* and is constructed in accordance with another embodiment of the present invention. The device 42 broadly comprises eye shield assembly 44 and attachment assembly 46. The eye shield assembly 44 includes a pair of lenses 48, 50 connected by a double-hinged bridge 52. Referring now to FIG. 4, the bridge 52 includes a centrally disposed panel 54, and a pair of outer panels 56, 58 hingedly coupled with the central panel 54. Panel 56 is coupled with lens 48 while panel 58 is coupled with lens 50. The bridge 52 permits selective pivoting of the lenses 48, 50 about separate axes and, therefore, selective curvature of the eye shield assembly 44.

The attachment assembly 46 includes support members 60, 62 and mounting member 64 positioned between and coupled with the support members 60, 62. The support members 60, 62 each include a buckle 66 and a leaf spring 68. The leaf springs 68 act to bias the mounting member 64 in a direction away from the eye shield assembly 44 in order to hold the mounting member 64 against the bottom of the visor 16.

The attachment assembly 46 further includes a flexible, elastic band 70 coupled with the buckles 66. The buckles 66 permit adjustment of the rest length of the band 70 spanning between support members 60, 62, and thus adjustment of the tension of the band 70. As a result, the attachment assembly 46 may be secured to visors 16 of various sizes and shapes.

Figure 3B:
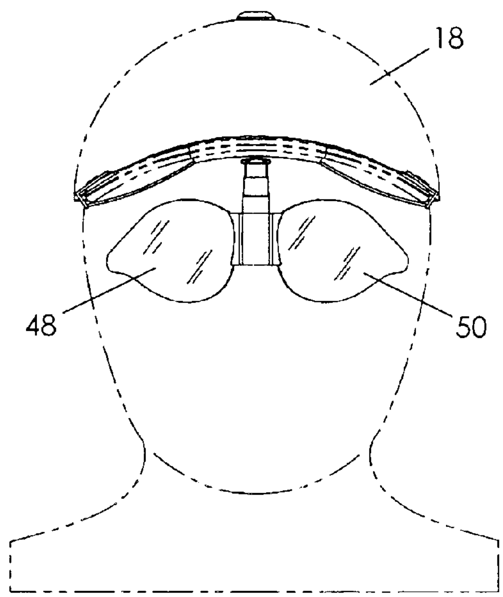
FIG. 3*b* is a front view of the device of FIG. 3*a* with the eye shield in a deployed position.
Figure 3C:
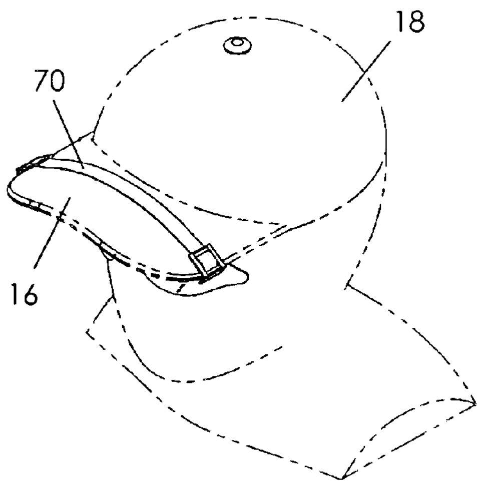
FIG. 3*c* is a perspective view of the device of FIG. 3*a* with the eye shield in a stowed position.
Figure 3D:
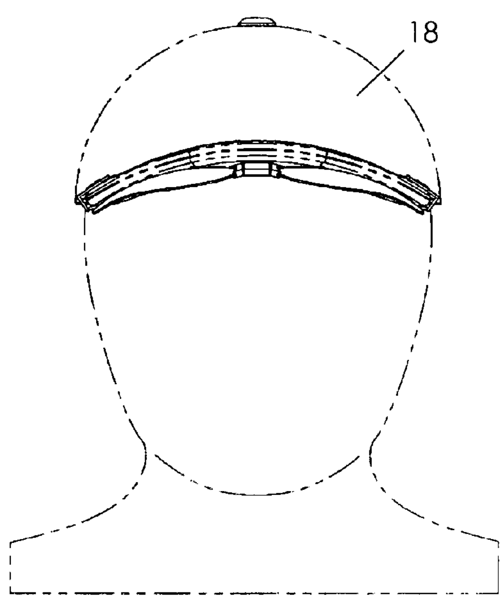
FIG. 3*d* is a front view of the device of FIG. 3*c;*
Figure 6A:
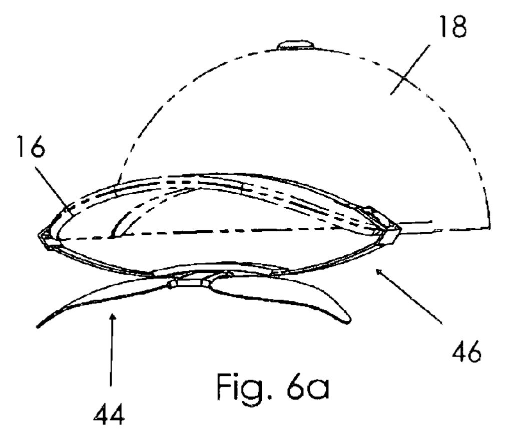
FIG. 6*a* is a perspective view of the device of FIG. 5*a;*
Figure 6B:
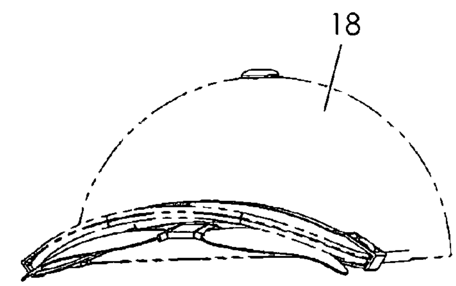
FIG. 6*b* is a perspective view of the device of FIG. 5*a* with the eye shield in a stowed position.
Figure 6C:
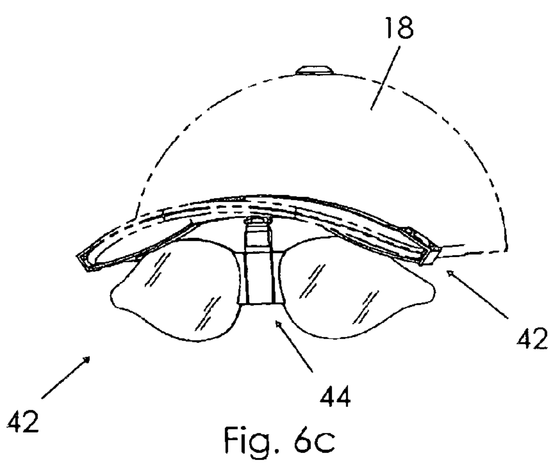
FIG. 6*c* is a perspective view of the device of FIG. 5*a* with the eye shield in a deployed position.
Figure 6D:
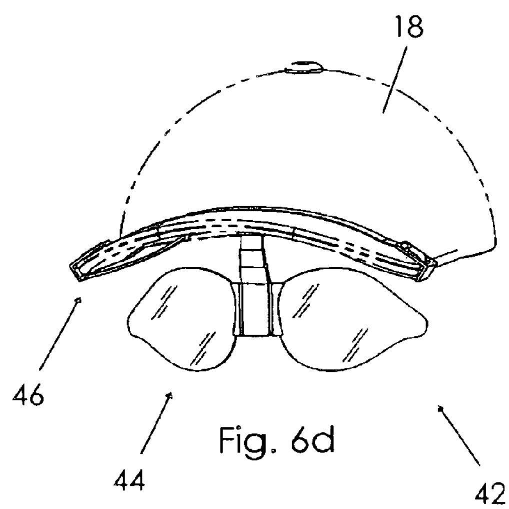
FIG. 6*d* is a perspective view of the device of FIG. 5*a* with the telescopic arm in an extended position.
Figure 7A:
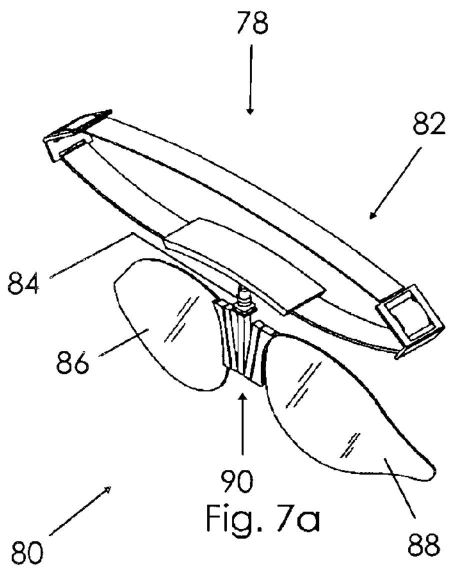
FIG. 7*a* is a perspective view of an eye shield device constructed in accordance with another embodiment of the present invention.
Figure 7B:
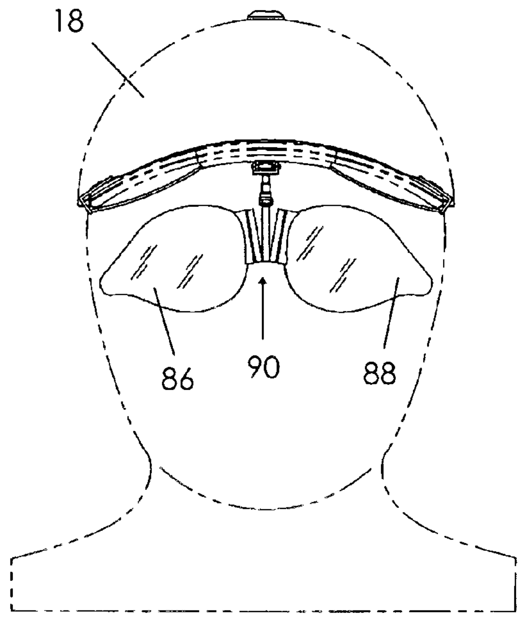
FIG. 7*b* is a front view of the device of FIG. 7*a* with the eye shield in a deployed position.
Figure 7C:
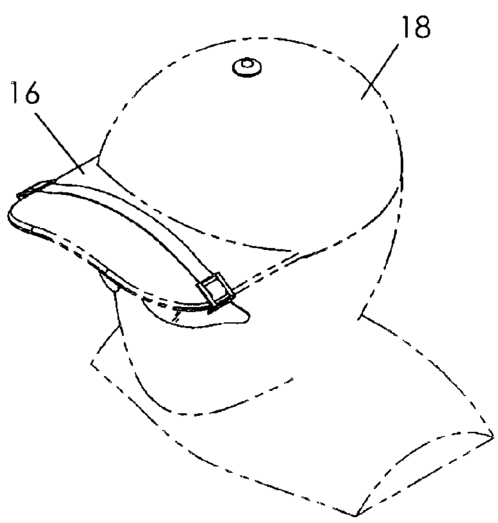
FIG. 7*c* is a perspective view of the device of FIG. 7*b;*
Figure 7D:
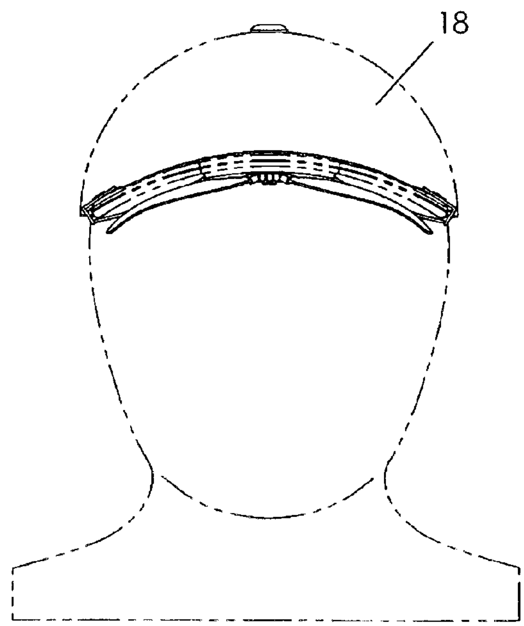
FIG. 7*d* is a perspective view of the device of FIG. 7*a* with the eye shield in a stowed position.

The bridge 52 is coupled with the mounting member 64 by a telescopic arm 72 having a proximal end 74 and a distal end 76. The proximal end 74 is coupled with the mounting member 64 for pivotal movement permitting selective positioning of the eye shield assembly 44 between a stowed position, shown in FIGS. 3*c* and 3*d*, and a deployed position, shown in FIG. 3*b*. The distal end 76 is pivotally coupled with the bridge 52 permitting additional adjustment of the eye assembly 44, as shown in FIGS. 6*c* and 6*d.*

Figure 5A:
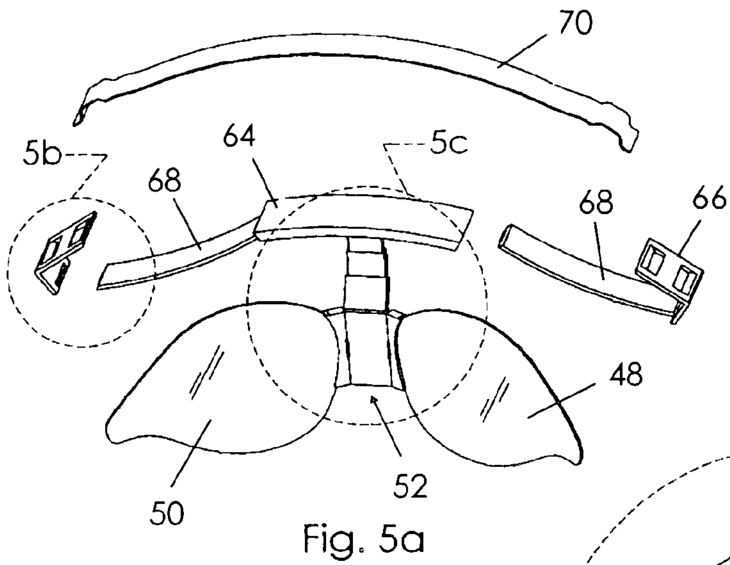
FIG. 5*a* is another exploded view of the device of FIG. 3*a;*
Figure 5B:
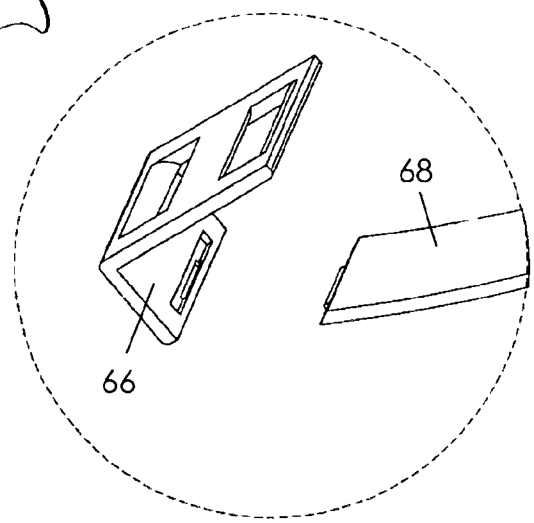
FIG. 5*b* is a fragmentary view of the device of FIG. 5*a* detailing the area in circle 5*b;*
Figure 5C:
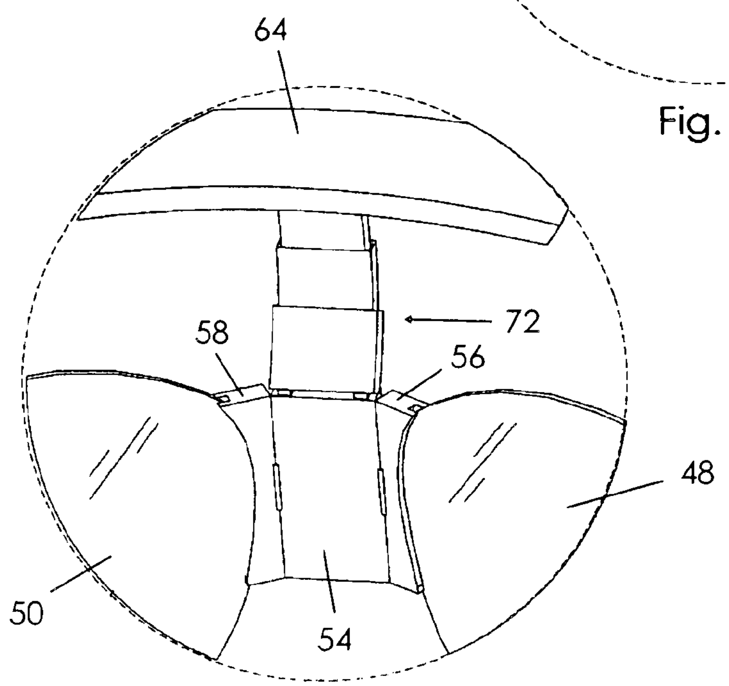
FIG. 5*c* is a fragmentary view of the device of FIG. 5*a* detailing the area in circle 5*c;*

Referring to FIGS. 5*a*–5*c*, additional detail of the device 42 is shown. For example, the leaf springs 68 are snap fitted with the respective buckles 66 for providing a flexible and secure coupling. The outer panels 56, 58 of the bridge 52 are friction fitted to the respective lenses 48, 50 and may be additionally secured by means of an adhesive.

Turning now to FIGS. 7*a*–7*d*, an eye shield device 78 constructed in accordance with still another embodiment of the present invention is shown. The device 78 broadly comprises an eye shield assembly 80 and an attachment assembly 82. The attachment assembly 82 is substantially similar to attachment assembly 46 with the exception that arm 84 is not of a telescopic design.

Figure 8:
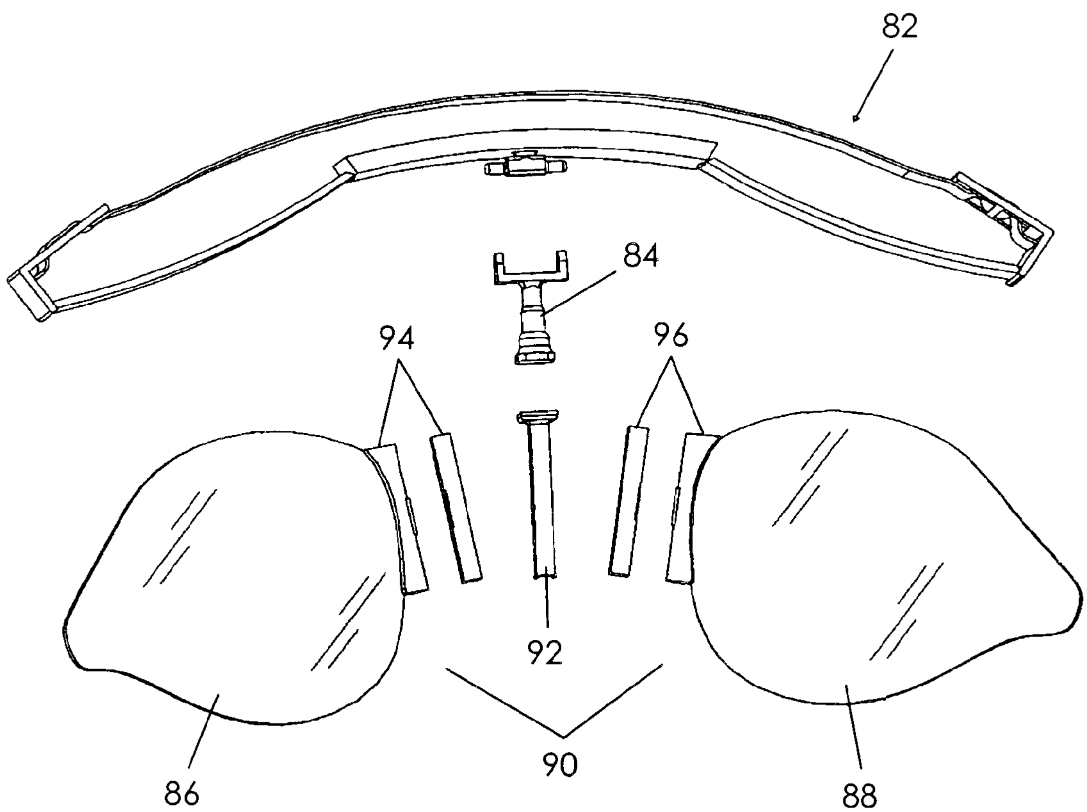
FIG. 8 is an exploded view of the device of FIG. 7*a*.

The eye shield assembly 80 includes a pair of lenses 86, 88 connected by a four hinged bridge 90. Referring to FIG. 8, the bridge 90 includes a central portion 92 coupled with the arm 84, and first and second outer portions 94, 96. The first and second outer portions 94, 96 are coupled with the central portion 92 for pivotal movement about generally parallel first and second bridge axes. The first and second outer portions 94, 96 each include a hinge permitting pivotal movement of the lenses 86, 88 about third and forth axes. The third and forth axes do not intersect the first and second axes. Therefore, the alternative eye shield device 78 permits adjustment of the curvature of the eye shield assembly 80 via selective pivotal movement of the bridge 90 about the third and forth axes, and permits adjustment of the distance between the lenses 86, 88 via selective movement of the bridge 90 about the first and second axes for adapting to users having varying eye spacing distances.

It is understood that while certain forms of this invention have been illustrated and described, it is not limited thereto except insofar as such limitations are included in the following claims and allowable functional equivalents thereof.

What is claimed is:

1. An eye shield device for a visor comprising:

an eye shield assembly;

an attachment assembly for removably attaching the eye shield assembly to the visor, the attachment assembly including:

a pair of opposed support members;

eye shield mount for coupling the eye shield assembly to the attachment assembly and for permitting pivotal movement of the eye shield assembly about a first axis; and a generally flexible, elastic band coupled with and spanning between the support members and held in tension by the support members, a visor-receiving slot being defined between the band and the eye shield assembly.

2. The eye shield device as set forth in claim 1, wherein the support members each define an adjustment slot.

3. The eye shield device as set forth in claim 2, wherein the eye shield assembly includes a lens having opposed sides, and the eye shield mount includes a pair of mounting members, each mounting member coupled with one of the sides of the lens and engaging one of the support members.

4. The eye shield device as set forth in claim 3, wherein each mounting member includes a post received in the adjustment slot of the support member with which the mounting member is engaged, the posts defining the first axis and permitting the pivotal movement of the eye shield assembly about the first axis.

5. The eye shield device as set forth in claim 4, wherein the adjustment slots are elongated permitting sliding of the posts therein for adjusting the position of the first axis relative to the support members.

6. The eye shield assembly as set forth in claim 3, wherein the eye shield assembly further includes a bendable shaping bar coupled with the lens along a top edge thereof for varying curvature of the lens.

7. The eye shield assembly as set forth in claim 6, wherein the shaping bar is constructed from a material that will retain its shape when bent for retaining a desired curvature of the lens.

8. An eye shield device for a visor comprising:

an eye shield assembly;

an attachment assembly for removably attaching the eye shield assembly to the visor, the attachment assembly including:

an eye shield support;

a telescopic arm having a proximal end and a distal end, the proximal end coupled with the support for pivotal movement about a first axis, the distal end coupled with the eye shield assembly;

wherein the eye shield assembly includes a pair of lenses coupled by a bridge; and wherein the bridge includes a central bridge panel having opposed side edges and a pair of outer bridge panels, each outer bridge panel hingedly coupled with one of the side edges of the central panel and coupled with one of the lenses, the bridge permitting independent pivotal movement of the lenses about separate axes.

9. The eye shield device as set forth in claim 8, wherein the eye shield support includes a pair of support members and a mounting member positioned between the support members from which the telescopic arm depends.

10. The eye shield device as set forth in claim 9, wherein the support members are each a leaf spring, biasing the mounting member in a direction away from the eye shield assembly.

11. The eye shield device as set forth in claim 10, wherein the attachment assembly further includes a generally flexible band coupled with and spanning between the support members, a visor-receiving slot being defined between the band and the eye shield assembly.

12. An eye shield device for a visor comprising:

an eye shield assembly;

an attachment assembly for removably attaching the eye shield assembly to the visor, the attachment assembly including:

an eye shield support; and an arm having a proximal end and a distal end, the proximal end pivotally coupled with the support and the distal end coupled with the eye shield assembly;

wherein the eye shield assembly includes first and second lenses connected by a bridge, the bridge including a central portion coupled with the arm, and first and second outer portions, the first and second outer portions being coupled with the central portion for pivotal movement about generally parallel first and second axes, the first and second outer portions each including a hinge permitting pivotal movement of the first and second lenses about third and forth axes, the third and forth axes not intersecting the first and second axes.

13. The eye shield device as set forth in claim 12, wherein the eye shield support includes a pair of support members and a mounting member positioned between the support members from which the arm depends.

14. The eye shield device as set forth in claim 13, wherein the support members are each a leaf spring, biasing the mounting member in a direction away from the eye shield assembly.

15. The eye shield device as set forth in claim 14, wherein the attachment assembly further includes a generally flexible band coupled with and spanning between the support members, a visor-receiving slot being defined between the band and the eye shield assembly.

16. The eye shield device as set forth in claim 15, wherein the band is constructed from an elastic material and is held in tension between the support members, and the support members each include a buckle for coupling with the band and for permitting adjustment of the tension of the band.

17. The eye shield device as set forth in claim 16, wherein the arm is telescopic permitting adjustment of the length of the arm.

* * * * *